(12) United States Patent
Sakamoto et al.

(10) Patent No.: US 6,962,552 B2
(45) Date of Patent: Nov. 8, 2005

(54) VEHICLE SHIFT CONTROL DEVICE AND CONTROL METHOD THEREFOR

(75) Inventors: Naoyuki Sakamoto, Toyota (JP); Kazuyuki Watanabe, Anjou (JP); Toshimitsu Sato, Toyota (JP); Atsushi Ayabe, Toyota (JP); Hiromichi Kimura, Okazaki (JP); Hideaki Ogasawara, Anjo (JP); Noboru Shibata, Anjo (JP); Mitsuhiro Nakamura, Anjo (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 10/207,976

(22) Filed: Jul. 31, 2002

(65) Prior Publication Data

US 2003/0027679 A1 Feb. 6, 2003

(30) Foreign Application Priority Data

Mar. 1, 2001 (JP) .......................... 2001-233133

(51) Int. Cl.$^7$ .......................... F16H 61/04; F16H 61/06
(52) U.S. Cl. .......................... 477/155; 701/59
(58) Field of Search .......................... 477/155; 701/59

(56) References Cited

U.S. PATENT DOCUMENTS 5,879,268 A * 3/1999 Yasue et al. ................. 477/143
6,259,983 B1 * 7/2001 Tsutsui et al. ................. 701/51
6,491,605 B2 * 12/2002 Saito et al. ................. 477/154

FOREIGN PATENT DOCUMENTS

| JP | 1-98745 | 4/1989 |
|----|---------|--------|
| JP | 4-59499 | 9/1992 |
| JP | 8-285064 | 11/1996 |
| JP | 8-320066 | 12/1996 |
| JP | 10-196776 | 7/1998 |
| JP | 10-331962 | 12/1998 |
| JP | 10-331963 | 12/1998 |
| JP | 11-201272 | 7/1999 |
| JP | 2001-182818 | 7/2001 |

* cited by examiner

*Primary Examiner*—Dirk Wright
(74) *Attorney, Agent, or Firm*—Oblon, Spivak, McClelland, Maier & Neustadt, P.C.

(57) ABSTRACT

A duty ratio for controlling an engagement force of a friction engagement device on the side of upshift engagement is corrected by an amount corresponding to an intermediate correction control value in the course of the shift. In addition, on a prerequisite condition that learning correction of a constant standby pressure control value at the start of the shift is converged, learning correction is performed for the intermediate correction control value according to a gradient of a turbine speed. Thus, a shift shock is prevented from occurring due to abrupt engagement of the friction engagement device and the like at the completion of the shift.

11 Claims, 8 Drawing Sheets

| POSITION | | CLUTCHES & BRAKES | | | | | | | O.W.C. | |
|---|---|---|---|---|---|---|---|---|---|---|
| | | C1 | C0 | C2 | B1 | B2 | C3 | B3 | F1 | F2 |
| N, P | | × | × | × | × | × | × | ○ | × | × |
| R | | × | × | ○ | × | ○ | × | ○ | × | × |
| D | 1st | ○ | × | × | × | × | × | ○ | ○ | △ |
| | 2nd | ○ | × | × | ○ | × | × | ○ | × | △ |
| | 3rd | ○ | ○ | × | × | × | × | ○ | × | △ |
| | 4th | × | ○ | × | ○ | × | × | ○ | × | △ |
| | 5th | × | ○ | × | ○ | × | ○ | × | × | × |
| | 1st ENGINE BRAKE | ○ | × | × | × | ○ | × | ○ | △ | △ |

VEHICLE SHIFT CONTROL DEVICE AND CONTROL METHOD THEREFOR

The disclosure of Japanese Patent Application No. 2001-233133 filed on Aug. 1, 2001 including the specification, drawings, and abstract is incorporated herein by reference in its entirety.

BACKGROUND OF THE INVENTION

1. Field of the Invention

The invention relates to a shift control device for a vehicle and a control method therefor. More specifically, the invention relates to engagement force control for a friction engagement device in the shift control device at the time of an upshift.

2. Description of Related Art

Figure 6:
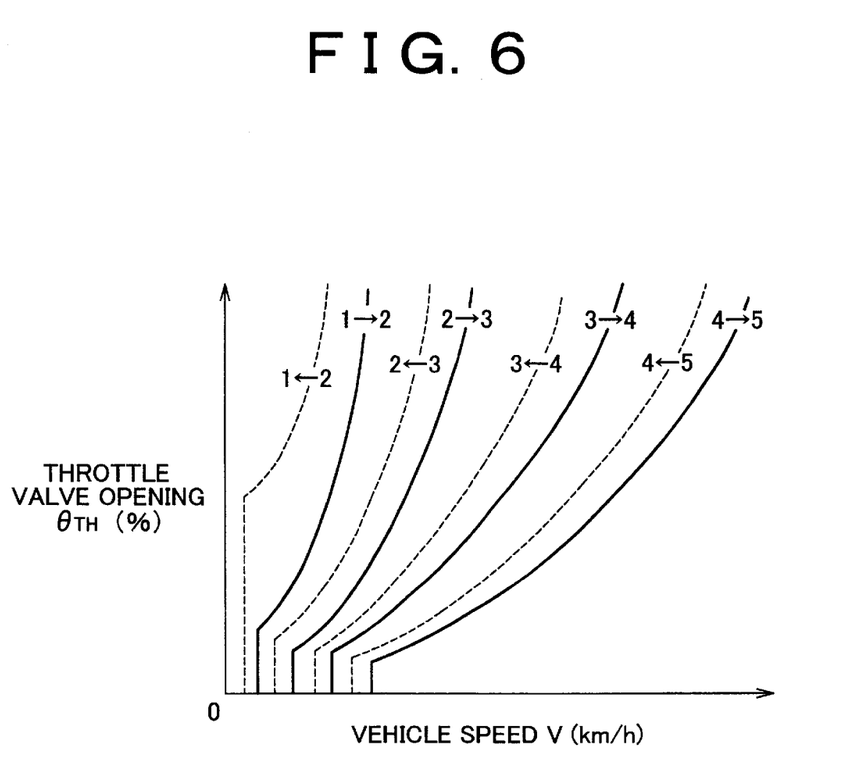
FIG. 6 shows an example of a shift map used in the shift control of an automatic transmission that is performed by the electronic control unit shown in FIG. 3.

An automatic transmission is widely used, in which a plurality of gear positions with different gear ratios are established according to engagement/release states of a plurality of friction engagement devices. The gear position of the automatic transmission can be automatically shifted according to a shift condition (a shift map or the like) set using parameters such as the amount of accelerator operation and the speed of a vehicle. For example, as shown in FIG. 6, the gear position can be shifted to a high speed side in which the gear ratio is low, as a vehicle speed V increases and as a throttle valve opening $\theta_{TH}$ (corresponding to the amount of accelerator operation) decreases. According to a related art of the invention, at the time of an upshift when a predetermined friction engagement device is engaged and the gear position is shifted to the high-speed side where the gear ratio is low, the engagement force of the friction engagement device is appropriately controlled to prevent a shift shock such as an abnormality, i.e., a sharp increase in revolutions of a drive power source, or to reduce the shifting time. For example, Japanese Patent Laid-Open Publication No. 10-331963 discloses an art in which an initial hydraulic pressure value (initial engagement force) at the start of shift is subjected to learning correction according to a change in an input revolution speed of an automatic transmission at an inertia-phase initial stage, and a hydraulic pressure preliminary fill time (backlash reducing time) is subjected to learning correction according to the time when an abnormality in revolutions of a drive power source has occurred.

However, even though the engagement force at the initial shift stage or the like is subjected to learning correction, there is a possibility that a shift shock such as a change in drive power may occur due to abrupt engagement at the completion of a shift, i.e., at the time when the friction engagement device is completely engaged.

SUMMARY OF THE INVENTION

The invention is made under the above-described circumstances, and an object thereof is to prevent a shift shock from occurring due to abrupt engagement of a friction engagement device at the completion of an upshift.

To achieve the object, according to a first aspect of the invention, a shift control device for a vehicle includes (a) an automatic transmission in which a plurality of gear positions with different gear ratios are established according to engagement/release states of friction engagement devices; and (b) force control portion which controls an engagement force of a predetermined friction engagement device from among the friction engagement devices at the time of an upshift when the friction engagement device is engaged and a shift to a gear position with a low gear ratio is performed. The device further includes (c) engagement force intermediate correction portion which performs correction of the engagement force of the friction engagement device, which is controlled by the engagement force control portion in the course of the upshift; and (d) intermediate correction value learning correction portion which performs modification of one of an intermediate correction value and a duration time of the correction according to an actual shift state. The intermediate correction value and the duration time of the correction represent an amount of the correction of the engagement force performed by the engagement force intermediate correction portion.

In the device according to the first aspect, the intermediate correction value learning correction portion may be used to perform modification of the intermediate correction control value or the duration time of the correction according to a change in an input revolution speed of the automatic transmission after the correction performed by the engagement force intermediate correction portion and before the completion of the shift.

The device may further include (a) initial engagement force learning correction portion which performs modification of an initial engagement force of the friction engagement device, which is controlled by the engagement force control portion, according to an actual shift state at the start of the upshift, and (b) the intermediate correction value learning correction portion may be used to perform modification of the intermediate correction value or the duration time of the correction on a learning-permitting condition that the modification of the initial engagement force, which is performed by the initial engagement force learning correction portion, is in a converged state.

According to the shift control device for a vehicle, the engagement force intermediate correction portion performs modification of the engagement force of the friction engagement device in the course of the upshift. In addition, the intermediate correction value learning correction portion performs learning correction (modification) of the intermediate correction value representing the amount of engagement force correction or the duration time of the correction representing the amount of engagement force correction, according to an actual shift state. Therefore, a change in the input revolution speed just before the completion of the shift can be controlled appropriately, and a shift shock is inhibited from occurring due to abrupt engagement and the like at the completion of the shift. Particularly, the intermediate correction value of the engagement force set by the engagement force intermediate correction portion or the duration time of the correction is subjected to the learning correction based on an actual shift state. As such, a shift shock can be appropriately inhibited regardless of individual differences (variations) in each component, time-dependent deterioration in the quality of friction materials and lubricating oils, and the like.

Moreover, learning correction is performed for the intermediate correction control value or the duration time of the correction according to the change in the input revolution speed of the automatic transmission after the correction performed by the engagement force intermediate correction portion and before the completion of the shift. This arrangement enables even more effective inhibition of a shift shock such as a change in drive torque at the time of complete engagement, i.e., at the time when the influence of the change in the input revolution speed is large.

Furthermore, when the initial engagement force at the start of the upshift is subjected to the learning correction based on an actual shift state, the overall shift state is influenced by the initial engagement force. However, learning correction is performed for the intermediate correction value in the course of the shift or the duration time of the correction, on the learning-permitting condition that the learning correction of the initial engagement force is in a converged state. Therefore, it is possible to prevent a reduction in the accuracy of the learning correction performed for the intermediate correction value or the duration time of the correction, and occurrence of hunting due to the influence of the learning correction performed for the initial engagement force.

The invention relates not only to the shift control device for a vehicle in the first aspect, but also to a shift control method for a vehicle and to a vehicle in which the device is mounted.

Widely known automatic transmissions include a planetary-gear type automatic transmission having a plurality of planetary gear units. As the friction engagement device, for example, a hydraulic friction engagement device engageable through a hydraulic actuator is suitably used. In this case, the control of the engagement force can be implemented by performing hydraulic control such as duty control of a linear solenoid valve, and the control may be implemented by, for example, performing direct control of supply hydraulic pressure or controlling accumulator back pressure.

The gear position of the automatic transmission is determined such that the position is automatically shifted according to the shift condition (such as a shift map) set using parameters representing, for example, the output amount required by a driver (such as the amount of accelerator operation or the throttle valve opening) and the vehicle speed, and an upshift is accomplished in the case that the required output amount decreases or the vehicle speed increases. The invention is suitably applied to a power-ON upshift that is executed in association with an increase in the vehicle speed during running when the power is transmitted from a drive power source to vehicle drive wheels. The invention can also be applied to an upshift that is executed in response to an upshift request issued by a driver through operation of a shift lever.

As the drive power source, an internal combustion engine, such as a gasoline engine or a diesel engine, is suitably used. Alternatively, however, a different drive power source, such as an electric motor, may be employed. If necessary, a hydraulic power transmission device such as a torque converter or a fluid coupling, or a take-off clutch for connecting or disconnecting power transmission is provided between the drive power source and the automatic transmission.

The engagement force control portion is configured to perform feed-forward control of the engagement force, such as the hydraulic pressure of the hydraulic friction engagement device, according to, for example, a predetermined change pattern. However, the engagement force control portion is capable of implementing various types of engagement force control such as feedback control. The feedback control in this case is performed to increase or reduce the engagement force according to, for example, the deviation between the input revolution speed of the automatic transmission and a target revolution speed, such that the input revolution speed of the automatic transmission changes at a predetermined rate of change or according to a predetermined change pattern. However, in the case of the feedback control, high control accuracy cannot always be obtained because of a delay in response and the like. As such, as in the invention, it is effective to make the arrangement such that the intermediate correction is performed in the course of the shift, and the amount of the correction is subjected to the learning correction so as to be reflected on the subsequent intermediate correction.

Although the invention relates to the engagement force control of the friction engagement device on the engagement side, in the case of a clutch-to-clutch shift for releasing one of a pair of friction engagement devices and engaging the other friction engagement device (including the case of releasing the device at a breath), engagement force control is also performed for another friction engagement device on the release side.

The engagement force intermediate correction portion may perform correction of the engagement force at any timing as long as the correction is performed in the course of a shift, i.e., during an inertia phase. However, it is preferable that the correction be performed when 50% or more, preferably 70% or more of the process of the shift (change in the input revolution speed) has been completed, in order to prevent a shock that can occur when the friction engagement device is completely engaged.

The intermediate correction value learning correction portion is preferably arranged to perform the learning correction of the intermediate correction value. Alternatively, however, the arrangement may be such that the duration time of the intermediate correction is modified (learning-corrected) to obtain a predetermined shift state. Alternatively, learning correction of both the intermediate correction value and duration time may be performed.

The intermediate correction value learning correction portion is preferably arranged to perform learning correction of the intermediate correction control value or the duration time of the correction according to a change in an input revolution speed of the automatic transmission after the correction performed by the engagement force intermediate correction portion and before the completion of the shift. However, the learning correction may be implemented using parameters representing the occurrence or the degree of torque fluctuation at the completion of the shift instead of using the parameter representing the change in the input revolution speed. Alternatively, since the input revolution speed substantially corresponds to a drive power source revolution speed, the drive power source revolution speed may be used instead of the input revolution speed. This also applies to other control functions.

The initial engagement force learning correction portion is preferably arranged to perform learning correction of the initial engagement force according to a change in an input revolution speed of the automatic transmission after the start of the shift and before the start of the correction to be performed by the engagement force intermediate correction portion. However, the learning correction may be performed using a different parameter.

The intermediate correction value learning correction portion and the initial engagement force learning correction portion may be configured to increase or reduce the intermediate correction value or the duration time of the correction, or the initial engagement force by a predetermined amount. However, various embodiments can be employed. For example, these portion may be configured to perform the modification by obtaining the amount of the modification according to the deviation between a predetermined control amount that changes depending on the learning correction and a target value. A determination as to whether the learning correction is in a converged state can be made based on, for example, whether the amount of the modification is lower than or equal to a predetermined value or whether the deviation between the control amount and the target value is lower than or equal to a predetermined value.

BRIEF DESCRIPTION OF THE DRAWINGS

The foregoing and further aspects, features and advantages of the invention will become apparent from the following description of preferred embodiments with reference to the accompanying drawings.

DETAILED DESCRIPTION OF PREFERRED EMBODIMENTS

Hereinbelow, an embodiment of the invention will be described in detail with reference to the accompanying drawings.

Figure 1:
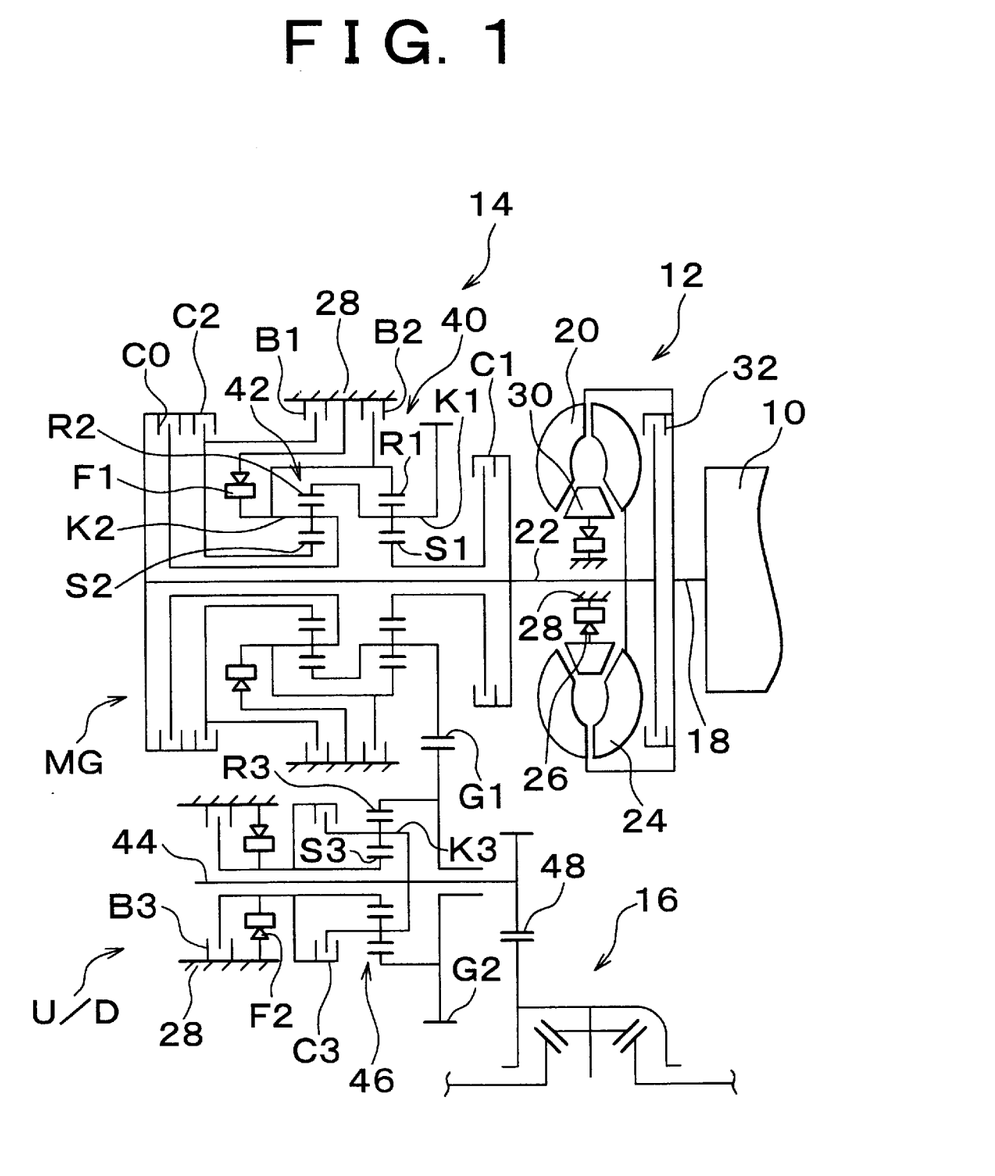
FIG. 1 is a schematic view showing the configuration of a vehicle drive device to which the invention is applied.

FIG. 1 is a schematic view of a transverse-type vehicle drive device for, for example, an FF (front engine-front drive) vehicle. Referring to the drawing, the output of an engine 10, such as a gasoline engine, is transmitted to vehicle drive wheels (front wheels) (not shown) via a torque converter 12, an automatic transmission 14, and a differential gear device 16. The torque converter 12 includes a pump impeller 20 coupled to a crankshaft 18 of the engine 10, a turbine impeller 24 connected to an input shaft 22 of the automatic transmission 14, a stator 30 fixed to a housing 28 (non-rotational member) via a one-way clutch 26, and a lockup clutch 32 coupled to the input shaft 22 via a damper (not shown). The engine 10 is a drive power source, and the torque converter is a hydraulic transmission device.

The automatic transmission 14 includes a pair of a single-pinion-type first planetary gear unit 40 and second planetary gear unit 42, a set of third planetary gear unit 46, and an output gear 48. The first planetary gear unit 40 and the second planetary gear unit 42 are coaxially disposed on the input shaft 22 and form a so-called CR-CR coupled planetary gear mechanism through the mutual coupling of carriers and ring gears. The set of third planetary gear unit 46 is coaxially disposed on a countershaft 44 provided in parallel with the input shaft 22. The output gear 48 is fixed to an end of the countershaft 44 and engages the differential gear unit 16. Components of the planetary gear units 40, 42, and 46, namely, sun gears, ring gears, and the carriers that rotatably support planetary gears to be engaged with them, are selectively coupled by four clutches C0, C1, C2, and C3. Alternatively, the components are selectively coupled to the housing 28 (non-rotational member) by three brakes B1, B2, and B3. Moreover, the components are engaged through one-way clutches F1 and F2 with one another or with the housing 28 depending on the rotational directions thereof. Since the differential gear unit 16 is formed to be symmetric with respect to an axial line (axle), the lower half thereof is not shown.

A main shift portion MG having four forward speeds and one reverse speed includes the pair of first planetary gear unit 40 and the second planetary gear unit 42, the clutches C0, C1, and C2, the brakes B1 and B2, and the one-way clutch F1, which are coaxially disposed on the input shaft 22. A secondary shift portion, namely, an underdrive section U/D includes the set of the planetary gear unit 46, the clutch C3, the brake B3, and the one-way clutch F2, which are disposed on the counter shaft 44. In the main shift portion MG, the input shaft 22 is coupled to a carrier K2 of the second planetary gear unit 42, a sun gear S1 of the first planetary gear unit 40, and a sun gear S2 of the second planetary gear unit 42 via the respective clutches C0, C1, and C2. A portion between a ring gear R1 of the first planetary gear unit 40 and the carrier K2 of the second planetary gear unit 42 is arranged to communicate with a portion between a ring gear R2 of the second planetary gear unit 42 and a carrier K1 of the first planetary gear unit 40. The sun gear S2 of the second planetary gear unit 42 is coupled to the housing 28 (non-rotational member) via the brake B1. The ring gear R1 of the first planetary gear unit 40 is coupled to the housing 28 (non-rotational member) via the brake B2. The one-way clutch F1 is provided between the carrier K2 of the second planetary gear unit 42 and the housing 28 (non-rotational member). A first counter gear G1 fixed to the carrier K1 of the first planetary gear unit 40 and a second counter gear G2 fixed to the ring gear R3 of the planetary gear unit 46 are engaged with each other. In the underdrive portion U/D, a carrier K3 of the third planetary gear unit 46 is connected to a sun gear S3 via the clutch C3. The brake B3 and the one-way clutch F2 are provided in parallel between the sun gear S3 and the housing 28 (non-rotational member).

Figure 2:
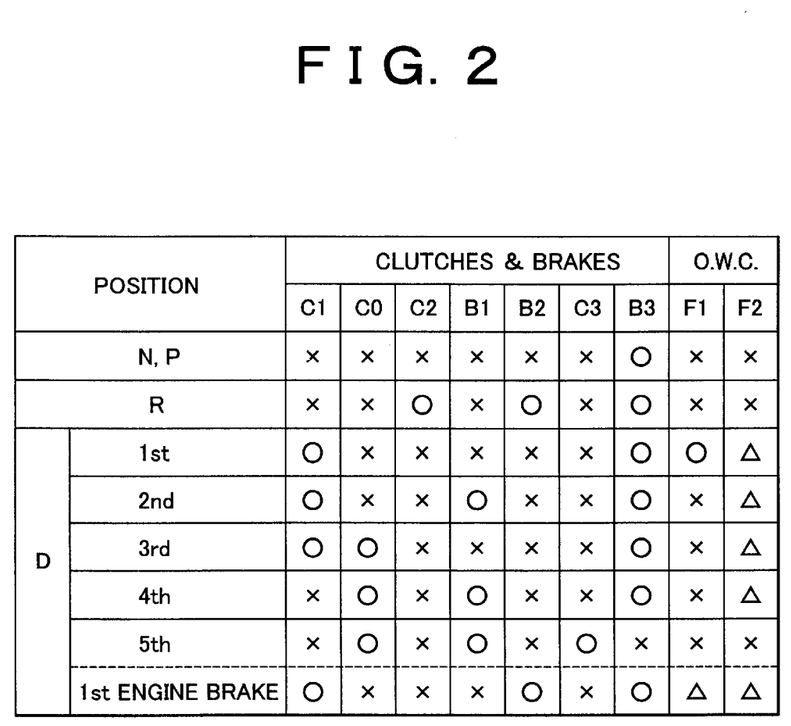
FIG. 2 is a view for explaining engagement operations of a clutch and a brake for establishing each gear position of an automatic transmission shown in FIG. 1.

The clutches C0, C1, C2, and C3 and the brakes B1, B2, and B3 (which hereinbelow will individually be referred to as clutches C and brakes B unless otherwise they need not be identified from one another) are hydraulic friction engagement devices such as multidisc clutches and band brakes that are engaged and controlled by hydraulic actuators. Therewith, a hydraulic control circuit 98 (shown in FIG. 8) is caused to perform switching in response to excitation or nonexcitation of linear solenoids SL1, SL2, SL3, and SLT and solenoids DSL, S4, and SR, and manual shift valves (not shown). By these operations, switching is executed between engagement states and release states as, for example, those shown in FIG. 2, according to gear positions of a shift lever 72 (shown in FIG. 3). Thus, gear positions for speeds such as five forward speeds and one reverse speed are established. Referring to FIG. 2, "1st" to "5th" represent first to fifth speed gear positions in the forward direction, the symbol "O" represents an engagement, the symbol "X" represents a release, and the symbol "Δ" represents an engagement only during operation. According to a shift pattern shown in FIG. 4, the shift lever 72 is operated to a parking operation position "P", a reverse-drive operation position "R", a neutral (drive power discontinuation) position "N", and forward-drive operation positions "D", "4", "3", "2", and "1". Manual shift valves are mechanically connected to the shift lever 72, and hydraulic paths are mechanically switched from one another according to the operation positions.

Referring to FIG. 2, for example, a 4→5 shift or a 5→4 shift between the fourth speed gear position and the fifth speed gear position is accomplished through engagement of the clutch C3 and release of the brake B3, or release of the clutch C3 and engagement of the brake B3 according to operation of the one-way clutch F2. A 1→2 shift or a 2→1 shift between the first speed gear position and the second speed gear position is accomplished through engagement or release of the brake B1. A 2→3 shift or a 3→2 shift between the second speed gear position and the third speed gear position is a so-called clutch-to-clutch shift that is accomplished through release of the brake B1 and engagement of the clutch C0 or through release of the clutch C0 and engagement of brake B1. Also, a 3→4 shift or a 4→3 shift between the third speed gear position and the fourth speed gear position is called the clutch-to-clutch shift that is accomplished through release of the clutch C1 and engagement of the brake B1 or through release of the brake B1 and engagement of the clutch C1. In addition, a downshift to a lower-speed gear position with which the engine brake is applied is performed through the clutch-to-clutch shift.

Figure 3:
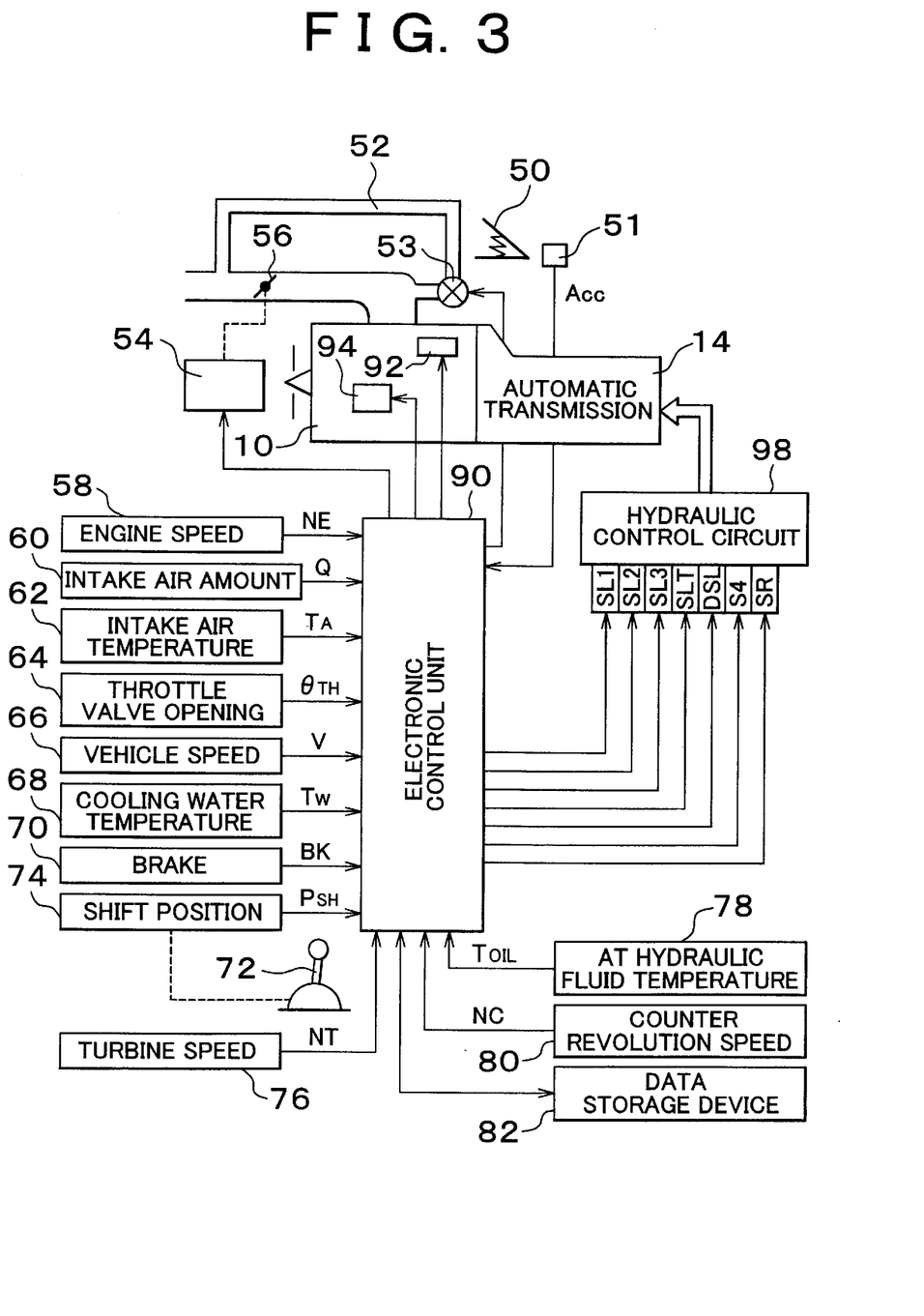
FIG. 3 is a block diagram for explaining a control system that performs control such as engine control and shift control in the vehicle drive device shown in FIG. 1.
Figure 4:
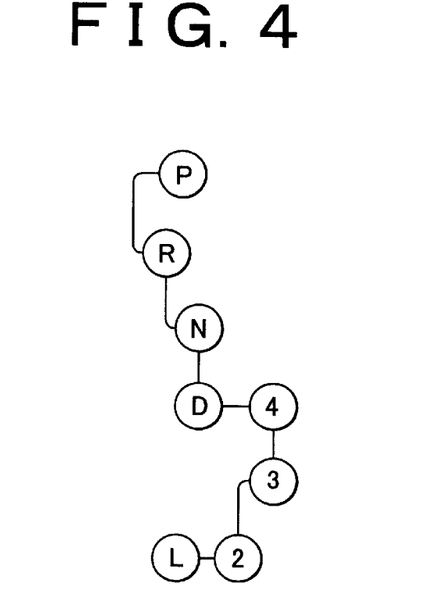
FIG. 4 shows an example of a shift pattern of a shift lever shown in FIG. 3.

FIG. 3 is a block diagram showing a control system provided in a vehicle for controlling, for example, the engine 10 and the automatic transmission 14 shown in FIG. 2. In the control system, the amount of operation of an accelerator pedal 50 (accelerator pedal operation amount Acc) is detected by an accelerator operation amount sensor 51. The accelerator pedal 50 is strongly depressed by a driver according to the amount of output required by the driver. The accelerator pedal 50 corresponds to an accelerator operating member, and the accelerator-pedal operation amount Acc corresponds to the required amount of output. An electronic throttle valve 56 controlled by a throttle actuator 54 to an opening angle (opening) $\theta_{TH}$ is provided in an intake pipe of the engine 10. In addition, an ISC (idle speed control) valve 53 is provided in a bypass passage 52 that bypasses the electronic throttle valve 56 to perform idle speed control. The ISC valve 53 controls the amount of intake air when the electronic throttle valve 56 is in a full-open state to control an idle speed $NE_{IDL}$ of the engine 10. In addition, the control system includes various sensors. The sensors include an engine speed sensor 58 for controlling a speed NE of the engine 10, an intake air amount sensor 60 for detecting an intake air amount Q of the engine 10, an intake air temperature sensor 62 for detecting a temperature $T_A$ of intake air, a throttle sensor with an idle-switch 64 for detecting a full-close state (idle state) of the electronic throttle valve 56 and the opening $\theta_{TH}$ thereof, a vehicle speed sensor 66 for detecting a speed $N_{out}$ of the countershaft 44 that corresponds to a vehicle speed V, a cooling water temperature sensor 68 for detecting a cooling water temperature $T_W$ of the engine 10, a brake switch 70 for detecting a brake operation, a shift position sensor 74 for detecting a shift position $P_{SH}$ (operation position) of the shift lever 72, a turbine speed sensor 76 for detecting a turbine speed NT (=speed $N_{IN}$ of the input shaft 22), an AT hydraulic fluid temperature sensor 78 for detecting an AT hydraulic fluid temperature $T_{OIL}$ representing the temperature of hydraulic fluid in the hydraulic control circuit 98, and a counter revolution speed sensor 80 for detecting a revolution speed NC of the first counter gear G1. These sensors feed signals indicative of the aforementioned detected factors to an electronic control unit 90, including the engine speed NE, the intake air amount Q, the intake air temperature $T_A$, a throttle valve opening $\theta_{TH}$, the vehicle speed V, the cooling water temperature $T_W$, a brake operation state BK, the shift position $P_{SH}$ of the shift lever 72, the turbine speed NT, the AT hydraulic fluid temperature $T_{OIL}$, and the counter revolution speed NC.

Figure 5:
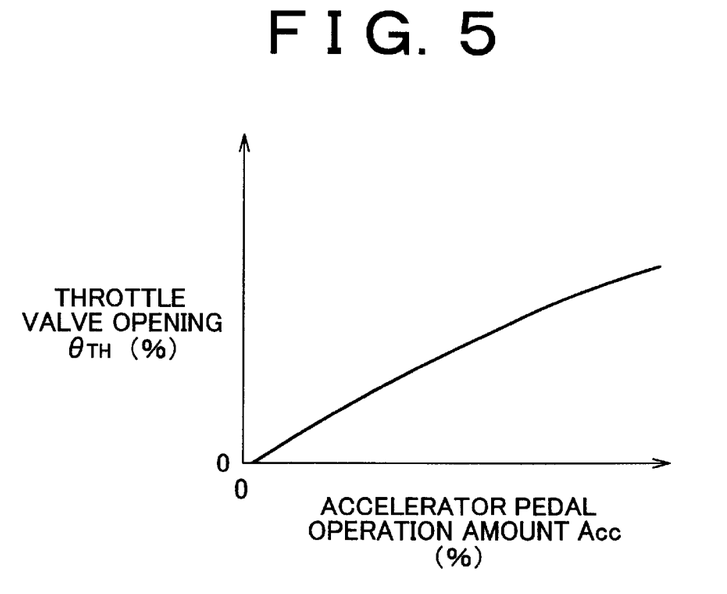
FIG. 5 shows an example of the relationship between an accelerator pedal operation amount Acc and a throttle valve opening $\theta_{TH}$ that are used in throttle control performed by the electronic control unit shown in FIG. 3.

The electronic control unit 90 is configured to include a so-called microcomputer provided with a CPU, a RAM, a ROM, and an input/output interface. Using a temporary storage function of the RAM, the CPU performs signal processing according to a program stored in the ROM, and thereby executes, for example, output control of the engine 10 and shift control of the automatic transmission 14. As such, if necessary, the CPU for engine control and the CPU for shift control are configured separately. The output control of the engine 10 includes open/close control of the electronic throttle valve 56 through use of the throttle actuator 54, control of a fuel injection valve 92 to implement control of the amount of fuel injection, control of an ignition device 94 such as igniter to implement ignition timing control, and control of the ISC valve 53 to implement idle speed control. The control of the electronic throttle valve 56 drives the throttle actuator 54 according to an actual accelerator pedal operation amount Acc based on, for example, the relationship shown in FIG. 5, and thus causes the throttle valve opening $\theta_{TH}$ to increase in proportion to the increase in the accelerator pedal operation amount Acc.

In the shift control of the automatic transmission 14, based on, for example, a prestored shift map (the shift condition) shown in FIG. 6, a gear position of the automatic transmission 14 is determined according to an actual throttle valve opening $\theta_{TH}$ and a vehicle speed V. Then, to establish the determined gear position, for example, switching is performed between ON (excitation) and OFF (non-excitation) states of the solenoids DSL, S4, and SR. In addition, the excitation states of the linear solenoids SL1, SL2, SL3, and SLT are continually changed through, for example, duty control. The linear solenoids SL1, SL2, and SL3 are capable of directly controlling hydraulic pressures for engagements of the brake B1 and the clutches C0 and C1, respectively. Thus, the linear solenoids regulates and controls the hydraulic pressures to prevent occurrence of a shift shock such as a change in drive power and deterioration in durability of friction materials. Referring to FIG. 6, each solid line represents an upshift line, and each dashed line represents a downshift line. A shift is implemented toward a high-speed gear position with a low gear ratio (=input revolution speed $N_{IN}$/output revolution speed $N_{out}$) as the vehicle speed V increases or the throttle valve opening $\theta_{th}$ decreases. The numerals "1" to "5" represents the first speed gear position "1st" to the fifth speed gear position "5th".

Figure 7:
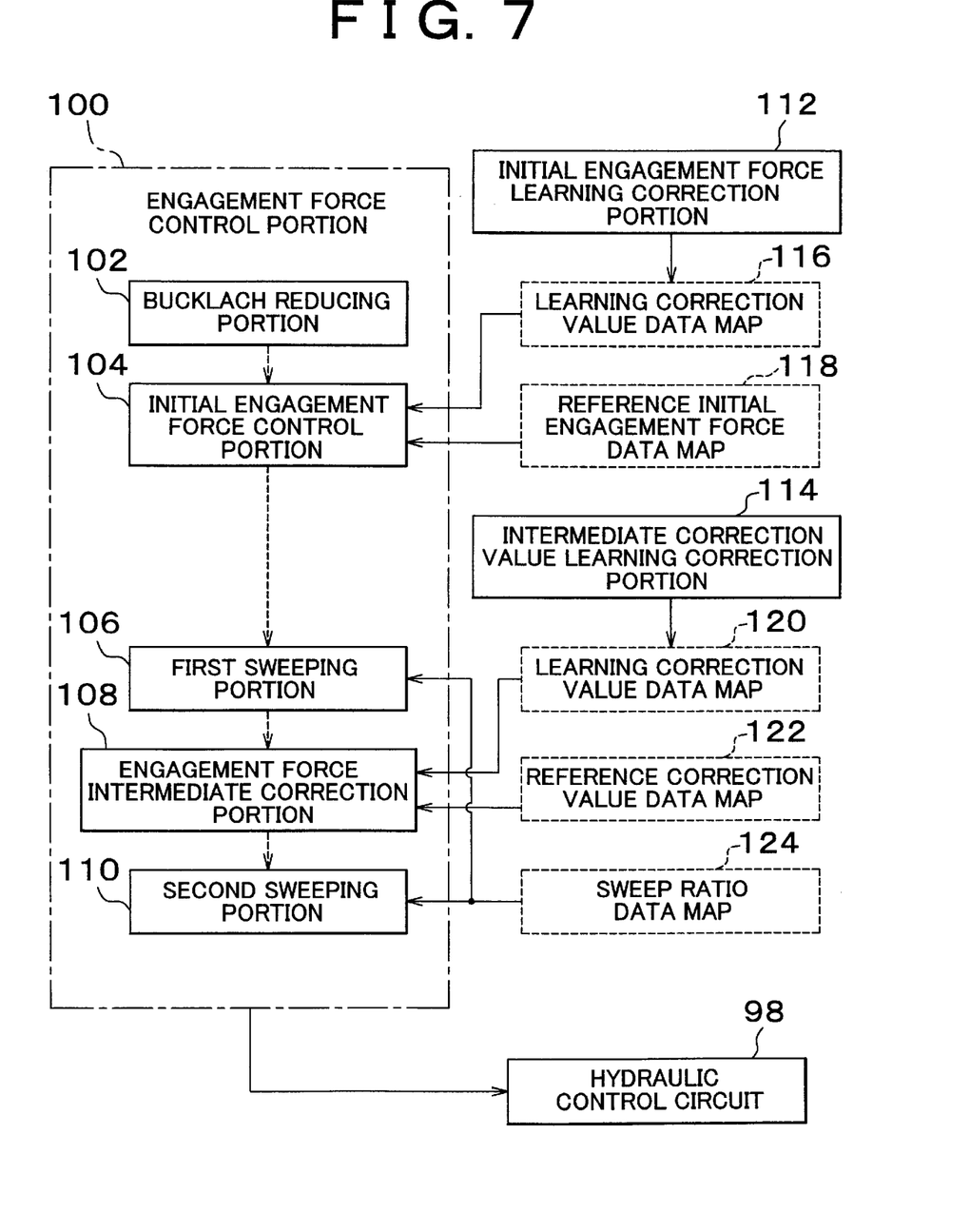
FIG. 7 is a block diagram for explaining functions related to engagement force control of a friction engagement device on the engagement side at the time of an upshift, which is executed by the electronic control unit shown in FIG. 3.

In addition, as shown in FIG. 7, the electronic control unit 90 includes functional members to implement engagement force control of a frictional engagement device on the engagement side during power-ON upshifts that causes a shift to a high-speed gear position when the vehicle is driven. The functional members include an engagement force control portion 100, an initial engagement force learning correction portion 112, and an intermediate correction value learning correction portion 114. In the upshift, the engagement force control is performed as follows. In the case of an 1→2 upshift and a 3→4 upshift where the brake B1 is engaged and in the case of a 2→3 upshift where the clutch C0 is engaged, hydraulic pressures $P_{B1}$ and $P_{C0}$ of the respective brake B1 and the clutch C0 are regulated through duty control of exciting currents of the linear solenoids SL1 and SL2 of the hydraulic control circuit 98, and the engagement forces of the brake B1 and the clutch C0 are thus controlled.

The engagement force control portion 100 includes a backlash reducing portion 102, an initial engagement force control portion 104, a first sweeping portion 106, an engagement force intermediate correction portion 108, and a second sweeping portion 110. For example, as shown in a time chart in FIG. 9, the engagement force control portion 100 follows a change pattern, in which a duty ratio DSL1 is predetermined, so as to perform feed-forward control of the hydraulic pressure of the hydraulic actuator. FIG. 9 shows the case where the brake B1 is engaged for a 3→4 upshift. Time t1 represents a time at which a 3→4 upshift command is output. Hereinbelow, the case of the 3→4 upshift will be described in detail.

In response to the 3→4 upshift command, the backlash reducing portion 102 functions such that the duty ratio DSL1 is reduced to a backlash reduction set value $DSL1_A$, the ratio is maintained for a predetermined time, and thus hydraulic fluid is rapidly filled into the hydraulic actuator within a range where the brake B1 does not generate an engagement torque. In the embodiment, as the duty ratio DSL1 decreases, the hydraulic pressure $P_{B1}$ increases.

Subsequently, the initial engagement force control portion 104 reads a learning correction value "gdupapl" from a learning correction value data map 116, reads a constant standby pressure reference value "upapl" from a reference initial engagement force data map 118, and rechanges the duty ratio DSL1 to a constant standby pressure control value $DSL1_B$ that is the sum of the readout values "gdupapl" and "upapl". Thereby, the initial engagement force control portion 104 controls the hydraulic pressure $P_{B1}$ to a constant standby pressure corresponding to the constant standby pressure control value $DSL1_B$. The learning correction value "gdupapl" is stored in the learning correction value data map 116 using a parameter representing, for example, the turbine speed NT at the time of shift command output. In addition, the learning correction value "gdupapl" is sequentially subjected to the learning correction that is performed by the initial engagement force learning correction portion 112 according to an actual shift state to suppress a shift shock such as a sudden increase in engine speed. The constant standby pressure reference value "upapl" is stored in the reference initial engagement force data map 118 using parameters representing operation states such as the type of a shift, the AT hydraulic fluid temperature $T_{OIL}$, the vehicle speed V, the turbine speed NT, and an estimated input torque. The learning correction value data map 116 and the reference initial engagement force data map 118 are stored in a data storage device 82 (shown in FIG. 3) composed of, for example, an SRAM, that is appropriately rewritable and that is capable of preserving stored even in a power-OFF state. The constant standby pressure control value $DSL1_B$ corresponds to an initial engagement force of the brake B1.

The duty ratio DSL1 is maintained at the constant standby pressure control value $DSL1_B$ by the initial engagement force control portion 104 in a period up to the start of an inertia phase in which the turbine speed NT begins to change according to frictional engagement of the brake B1. Upon the start of the inertia phase, the duty ratio DSL1 is gradually reduced by the first sweeping portion 106 by a predetermined sweep ratio, and the hydraulic pressure $P_{B1}$ is gradually increased according to the change in the duty ratio DSL1. A determination as to whether the inertia phase has started can be made through a comparison between a preshift gear position revolution speed NTBF and an actual turbine speed NT. The preshift gear position revolution speed NTBF is obtained from a gear ratio of the preshift gear position (the third speed gear position in FIG. 9) and the counter revolution speed NC or the vehicle speed V (output revolution speed $N_{out}$). The sweep ratio is preliminarily set in a sweep ratio data map 124 using parameters representing, for example, the turbine speed NT and an estimated input torque at the time of shift command output. The sweep ratio data map 124 is stored in the data storage device 82. Time t2 in FIG. 9 represents the start time of the inertia phase. Suppose the case where the duty ratio DSL1=$DSL1_B$ continues even after a predetermined backup time has elapsed, but the inertia phase does not start. In this case, a sweep of the duty ratio DSL1 is forced to be started by the first sweeping portion 106, and update is performed by a backup learning correction portion (not shown) so that the learning correction value "gdupapl" in the learning correction value data map 116 increases the constant standby pressure.

The engagement force intermediate correction portion 108 reads the learning correction value "gdupend" from a learning correction value data map 120, and reads a reference correction value "upend" from a reference correction value data map 122, increases the duty ratio DSL1 by an intermediate correction control value GD, which is the sum of the aforementioned read values "gdupend" and "upend", at predetermined timing during the shift, and thus reduces the hydraulic pressure $P_{B1}$ by the hydraulic pressure (intermediate correction value) that corresponds to the intermediate correction control value GD. The learning correction value "gdupend" is stored in the learning correction value data map 120 using a parameter representing the turbine speed NT at the time of shift command output. In addition, the learning correction value "gdupend" is sequentially learning-corrected by the intermediate correction value learning correction portion 114 according to an actual shift state to prevent a shift shock such as an output shaft torque fluctuation from occurring just before completion of the shift. The reference correction value "upend" is stored in the reference correction value data map 122 using parameters representing operation states, such as the type of a shift, the AT hydraulic fluid temperature $T_{OIL}$, the vehicle speed V, the turbine speed NT, and an estimated input torque. The learning correction value data map 120 and the reference correction value data map 122 are stored in the data storage device 82. Time t4 is time at which the duty ratio DSL1 is corrected by the engagement force intermediate correction portion 108.

Subsequently, the duty ratio DSL1 is gradually reduced by the second sweep portion 110 by a predetermined sweep ratio, and the hydraulic pressure $P_{B1}$ is gradually increased according to the change in the duty ratio DSL1. In addition, when the brake B1 has been completely engaged according to the increase in the hydraulic pressure and the shift has been thus completed, the duty ratio is controlled to be DSL=0, the hydraulic pressure $P_{B1}$ is increased up to a line pressure PL, and the brake B1 is stably maintained in an engaged state. The sweep ratio in this case may be the same as that used with the first sweeping portion 106. However, the sweep ratio may either be increased or reduced by multiplying a predetermined correction coefficient or be independently set using a different sweep ratio map. A determination as to whether the shift has been completed can be made based on whether a postshift gear position revolution speed NTUP coincides with an actual turbine speed NT. The postshift gear position revolution speed NTUP is obtained from a gear ratio of the postshift gear position (fourth speed gear position in FIG. 9) and the counter revolution speed NC or the vehicle speed V (output revolution speed $N_{out}$). Time t6 in FIG. 9 represents the shift completion time.

As described above, the duty ratio DSL1 is subjected to feed-forward control that is performed according to the predetermined change pattern. Thus, the hydraulic pressure $P_{B1}$ is gradually increased to cause frictional engagement of the brake B1, the turbine speed NT is reduced, and a 3→4 shift is accomplished. The clutch C1, which functions as the friction engagement device on the release side, is released by performing duty control of the exciting current of linear solenoid SL3 and reducing a hydraulic pressure $P_{C1}$, in order to prevent an abnormality such as a sudden increase in engine speed and tie-up.

Figure 8:
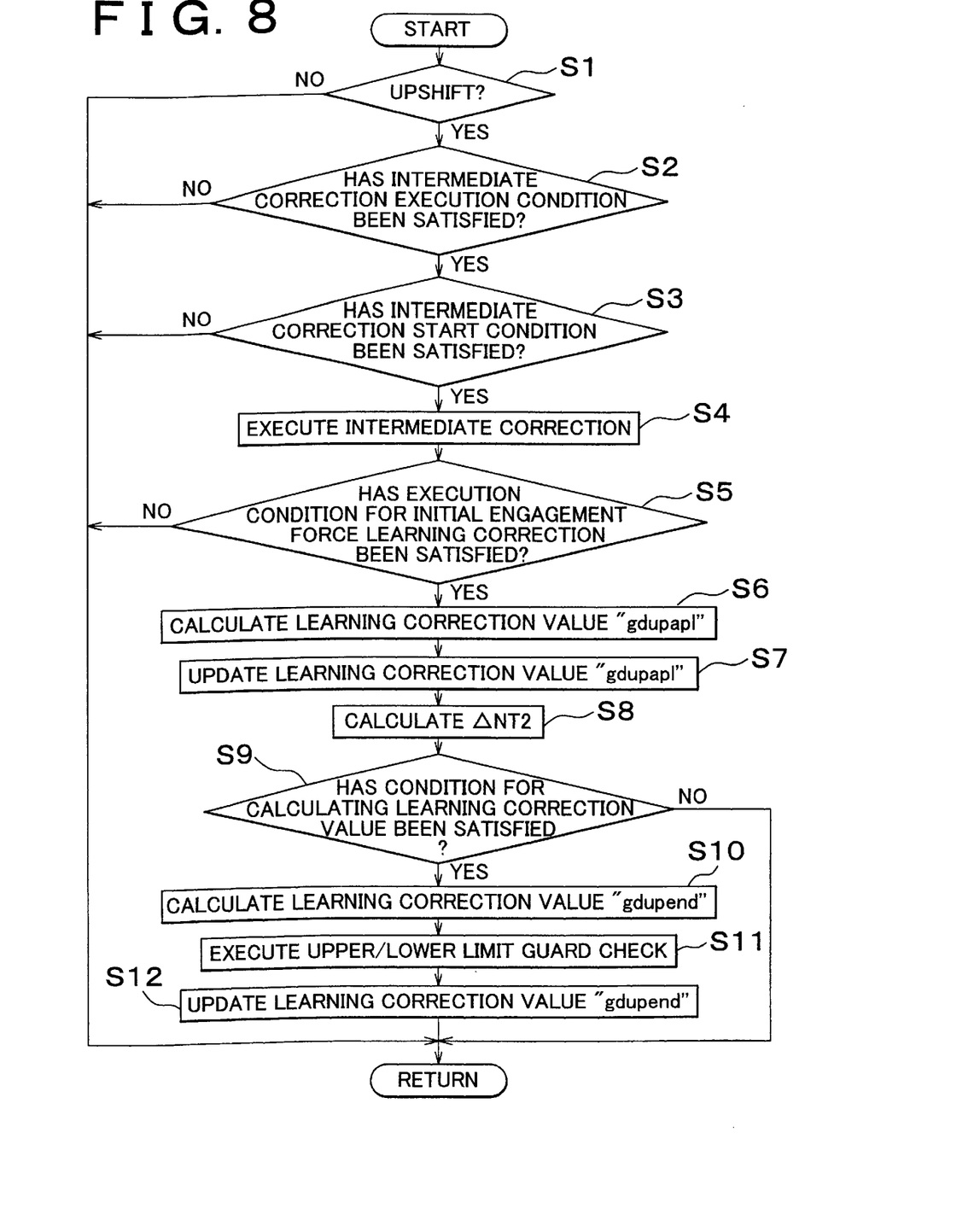
FIG. 8 is a flowchart for explaining in detail the contents of signal processing performed by an engagement force intermediate correction portion and an intermediate correction value learning correction portion that are shown in FIG. 7.
Figure 9A:
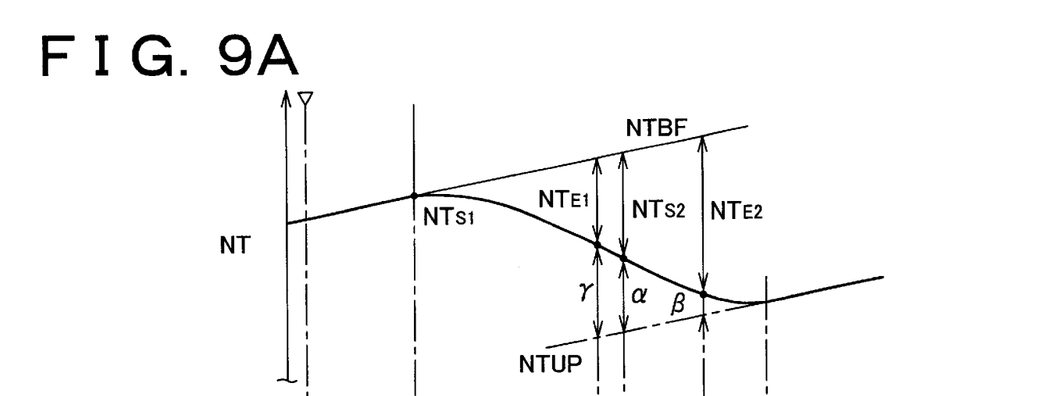
FIGS. 9A, 9B, 9C, and 9D are examples of time charts showing changes in operation states in respective sections during a 3→4 upshift, FIG. 9A showing a change in the number of turbine revolutions, FIG. 9B showing a change in duty ratio of a hydraulic pressure actuator, FIG. 9C showing a change in hydraulic pressure of the hydraulic pressure actuator, and FIG. 9D showing a change in torque of an output shaft of the automatic transmission.
Figure 9B:
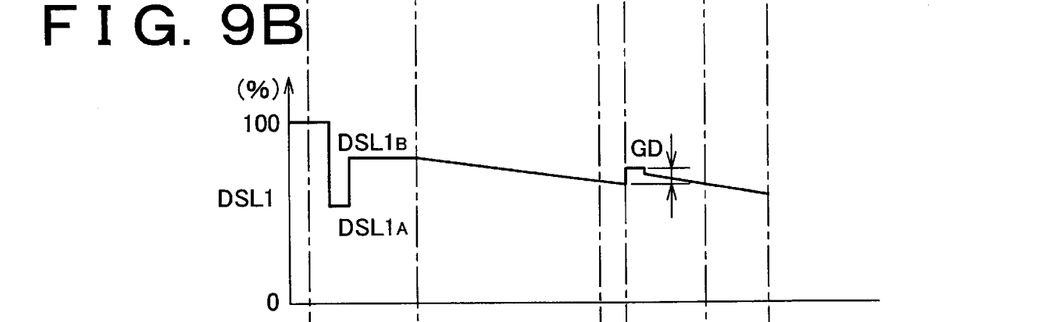
Figure 9C:
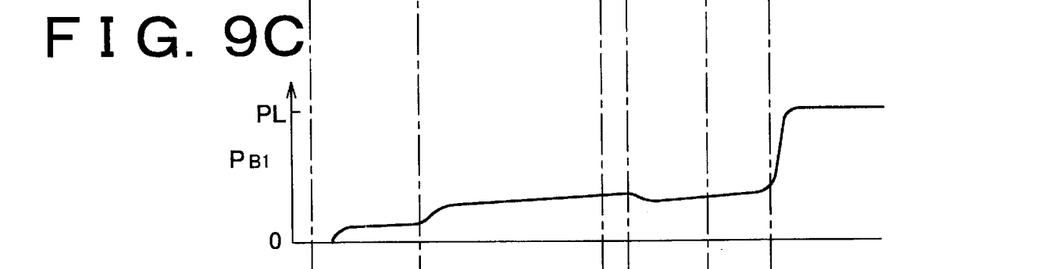
Figure 9D:
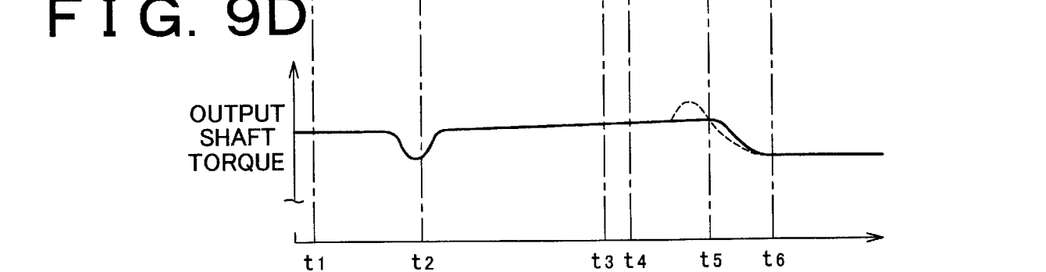

FIG. 8 is a flowchart showing in detail the contents of signal processing that is performed by the engagement force intermediate correction portion 103 and the intermediate-correction-value learning correction portion 114. Steps S1 to S4 are executed by the engagement force intermediate correction portion 108, Steps S5–7 are executed by the engagement force intermediate correction portion 112, and steps S8 to S10 are executed by the intermediate-correction-value learning correction portion 114.

Referring to FIG. 8, in step S1, it is determined whether an upshift command has been output for an upshift in the range to the fourth speed gear position. If the upshift command has been issued, step S2 is executed to determine whether the intermediate correction execution condition is satisfied. The intermediate correction execution condition is predetermined such that all the following conditions are satisfied:

(1) A single upshift is performed;
(2) The vehicle is in a driven and run state (specifically, in a state where the idle switch is OFF);
(3) The AT hydraulic fluid temperature $T_{OIL}$ is within a predetermined range;
(4) The engine cooling water temperature $T_W$ is higher than or equal to a predetermined value;
(5) The turbine speed NT is higher than or equal to a predetermined value; and
(6) The sweep start by the first sweeping portion 106 is not caused on expiration of the backup time.

If the intermediate correction execution condition has been satisfied, it is determined whether the intermediate correction start condition has been satisfied in step S3. The correction start condition required that a speed deviation (NT−NTUP) between the turbine speed NT and the postshift gear position revolution speed NTUP become less than or equal to a predetermined decision value "α". The decision value "α" is set such that, for example, it can be determined that the about 50% or more, preferably 70% to 80%, of the shift process has been completed. The decision value "α" is set based on a data map, an arithmetic equation, and the like using parameters representing the turbine speed NT at the time of shift command output, the type of the shift, the vehicle speed V, and the like. For example, the progress of the shift can be determined by defining the revolution speed deviation between the preshift gear position revolution speed NTBF and the postshift gear position revolution speed NTUP as 100%. If the intermediate correction start condition has been satisfied, the learning correction value "gdupend" is read from the learning correction value data map 120, and the reference correction value "upend" is read from the reference correction value data map 122 in step S4. Then, the duty ratio DSL1 is increased by the intermediate correction control value GD, which is the sum of the aforementioned read values "gdupend" and "upend", and thus the hydraulic pressure $P_{B1}$ is reduced. Time T4 in FIG. 9 represents the time at which the speed deviation satisfies the equation (NT−NTUP)≦α, and the intermediate correction is therefore started. After the duty ratio DSL1 is maintained for a predetermined time, the process proceeds to a sweep that is to be performed by the second sweeping portion 110.

Subsequently, in step S5, it is determined whether the execution condition for the initial engagement force correction has been satisfied. This step is performed because the learning correction cannot be appropriately performed for the intermediate correction value (intermediate correction control value GD) in an operation state where the learning correction is not appropriately performed for the initial engagement force, namely, the constant standby pressure control value $DSL1_B$. As such, for example, the execution condition for the initial engagement force correction is determined so that all the following conditions are satisfied:

(1) A single upshift is performed;
(2) The shift is not the first upshift after an ignition switch has been turned ON;
(3) The vehicle is not running on a low μ road;
(4) The AT hydraulic fluid temperature $T_{OIL}$ is within a predetermined range;
(5) The vehicle speed V is within a predetermined range; and
(6) The shift is not performed at shift pattern change time such as very low temperature time.

If the execution condition has been satisfied, in step 6, a new learning correction value "gdupal" is calculated based on a deviation between a turbine speed slope ΔNT1 in the first-half shift part and a predetermined target value ΔNT1*. The predetermined target value ΔNT1* is set using parameters representing, for example, the turbine speed NT and an estimated input torque at the time of shift command output to prevent a shift shock such as a sudden increase in engine speed. Next, in step 7, a learning correction value "gdupapl" in a corresponding portion of the learning correction value date map 116 is rewritten. Next, it proceeds to the step 8, and a turbine speed slope ΔNT2 in the latter-half shift part is calculated according to an equation (i) given below. Specifically, the turbine speed slope ΔNT2 corresponds to the amount of a change per 150 msec in the turbine speed NT. In the equation (i), $NT_{S2}$ represents a revolution speed deviation between the turbine speed NT and the preshift gear position revolution speed NTBF at measurement start time, that is, the time when the intermediate correction has started (time T4 in FIG. 9) in the present embodiment. $NT_{E2}$ represents revolution speed deviation between the turbine speed NT and the preshift gear position revolution speed NTBF at measurement completion time (time t5 in FIG. 9). TΔNT2 represents a period of time (msec) from the measurement start time to the measurement completion time (time t5 −t4 in FIG. 9). The measurement completion time is a time when the speed deviation (NT−NTUP) between the turbine speed NT and the postshift gear position revolution speed NTUP becomes smaller than or equal to a predetermined decision value β. The decision value β is set based on a data map, an arithmetic equation, and the like using parameters representing the turbine speed NT at the time of shift command output, the type of the shift, the vehicle speed V, and the like, such that, for example, it can be determined that about 90% of the shift process has been completed. In the embodiment, the change in the turbine speed NT corresponds to a change in an input revolution speed, and the turbine speed slope ΔNT2 is used as a parameter representing the shifting state and the amount of control performed by the learning correction.

$$\Delta NT2 = [(NT_{S2} - NT_{E2})/T\Delta NT2] \times 150 \qquad (i)$$

Subsequently, in step S9, it is determined whether the learning correction value calculation condition has been satisfied. For example, the learning correction value calculation condition is determined so that all the conditions listed below are satisfied. These conditions relate to a learning correction of the initial engagement force (constant standby pressure control value $DSL1_B$). The condition is thus set because the learning correction of the intermediate correction control value (intermediate correction control value GD) cannot be appropriately implemented unless control of the initial engagement force is stable.

(1) Learning correction performed by the initial-engagement-force learning correction portion 112 is converged; and (2) The learning correction value "gdupapl" of the initial engagement force has not been subjected to backup learning correction.

For example, the above condition (1) requires that a turbine speed slope ΔNT1 in the first-half shift part be within ±10% of a predetermined target value ΔNT1*. The initial engagement force learning correction portion 112 modifies the learning correction value "gdupapl" according to the deviation between the turbine speed slope ΔNT1 and the target value ΔNT1*. When the turbine speed slope ΔNT1 is within ±10% of the target value ΔNT1*, it can be considered that the amount of modification of the learning correction value "gdupapl" is small, and the learning correction is in a converged state. The turbine speed slope ΔNT1 corresponds to the amount of a change per 150 msec in the turbine speed NT, and is calculated according to an equation (ii) given below when the learning correction of the constant standby pressure control value $DSL1_B$ is performed by the initial-engagement-force learning correction portion 112. In the equation (ii), $NT_{S1}$ represents the revolution speed deviation between the turbine speed NT and the preshift gear position revolution speed NTBF at measurement start time, that is, the time when the inertia phase has started (time 2 in FIG. 9). $NT_{S1}$ is substantially "0". $NT_{E1}$ represents the revolution speed deviation between the turbine speed NT and the preshift gear position revolution speed NTBF at measurement completion time (time 3 in FIG. 9). TΔNT1 represents a period of time (msec) from the measurement start time to the measurement completion time (time t3 −t2 in FIG. 9). The measurement completion time is a time when the speed deviation (NT−NTUP) between the turbine speed NT and the postshift gear position revolution speed NTUP becomes smaller than or equal to a predetermined decision value "γ". The decision value "γ" is set based on a data map, an arithmetic equation, and the like using parameters representing the turbine speed NT at the time of shift command output, the type of the shift, the vehicle speed V, and the like, such that, for example, it can be determined that about 70% of the shift process has been competed. The decision value "γ" is greater than the above-described decision value "α".

$$\Delta NT1 = [(NT_{S1} - NT_{E1})/T\Delta NT1] \times 150 \qquad (ii)$$

When an affirmative determination (Yes) is obtained in step 9, that is, the learning correction value calculation condition has been satisfied, step S10 is executed. In step 10, a value (modification amount) obtained through multiplication of a predetermined gain with the deviation between the turbine speed slope ΔNT2 and a target value ΔNT2* is added to the original learning correction value "gdupend", and thus a new learning correction value "gdupend" is calculated. The target value ΔNT2* is set using parameters representing the turbine speed NT, an estimated input torque at the time of shift command output, and the like, so as to prevent a shift shock such as a sudden increase in engine speed. In step S11, a predetermined upper/lower limit guard is used to limit a new learning correction value "gdupend" and the modification amount thereof. Then, in step S12, a learning correction value "Edupend" in a corresponding portion of the learning correction value data map 120 is rewritten.

Although description has been made primarily on the case of the 3→4 upshift, the hydraulic control similar to the above is performed also in the cases of the 1→2 upshift and the 2→3 upshift. In the hydraulic control, duty ratios of the linear solenoids SL1 and SL2 for controlling the hydraulic pressures $P_{B1}$ and $P_{C0}$ of the brake B1 and the clutch C0, which are the friction engagement devices on the engagement side, are changed according to the predetermined change pattern. In addition, the intermediate correction is performed in the course of the shift; and the intermediate correction value (intermediate correction control value GD) therefor and the constant standby control value representing the initial engagement force is subjected to the learning correction.

According to the embodiment, the engagement force intermediate correction portion 108 corrects the engagement force of the friction engagement device on the engagement side in the course of the upshift, and the intermediate correction value learning correction portion 114 sequentially performs learning correction (modifications) for the intermediate correction control value according to an actual shift state. As such, a change in the turbine speed NT just before completion of the shift can be appropriately controlled to prevent a shift shock from occurring due to abrupt engagement of the friction engagement device at the completion of the shift. Particularly, the intermediate correction control value GD is subjected to learning correction according to an actual shift state. As such, a shift shock can be appropriately suppressed regardless of individual differences (variations) in each component and time-dependent deterioration in the quality of friction materials and lubricating oils.

In addition, the intermediate correction control value GD is subjected to the learning correction according to the slope ΔNT2 of the turbine speed NT that has been developed after the correction performed by the engagement force intermediate correction portion 108 and before completion of the shift. This arrangement enables even more effective suppression of a shift shock such as a drive torque fluctuation at the time of complete engagement, i.e., at the time when the influence of the change in the turbine speed NT is large. More specifically, when the turbine speed NT crosses the postshift gear position revolution speed NTUP at a large angle, torque fluctuation tends to occur, as shown by a dashed line in FIG. 9D. For this reason, the hydraulic control is preferably performed so that the turbine speed NT smoothly crosses the postshift-gear-position revolution speed NTUP.

Moreover, according to the embodiment, the constant standby pressure control value $DSL1_B$ at the upshift start time is subjected to the learning correction according to the turbine speed slope $\Delta NT1$ in the first-half shift part. In this case, the learning correction is performed for the intermediate correction control value GD on a prerequisite condition that the learning correction of the constant standby pressure control value $DSL1_B$ is converged. In the embodiment, it is possible to prevent a reduction in the accuracy of the learning correction of the intermediate correction control value GD and occurrence of hunting due to the influence of the learning correction of the constant standby pressure control value $DSL1_B$. Particularly, the present embodiment is arranged such that no mutual overlap takes place between the measurement region (time t2 to time t3) of the turbine speed slope $\Delta NT1$ for the learning correction of the constant standby pressure control value $DSL1_B$ and the measurement region (time t4 to time t5) of the turbine speed slope $\Delta NT2$ for the learning correction of the intermediate correction control value GD. This arrangement reduces the mutual interference between the two learning corrections.

While the invention has been described in detail with reference to the accompanying drawings, it is to be understood that the above is just one embodiment, and various other embodiments may be implemented with modifications and improvements based on skills and knowledge of the those skilled in the art.

What is claimed is:

1. A shift control device for a vehicle, comprising:
    an automatic transmission provided with friction engagement devices, in which a plurality of gear positions with different gear ratios are established according to engagement/release states of the friction engagement devices;
    an engagement force control portion which controls an engagement force of a predetermined friction engagement device from among the friction engagement devices at the time of an upshift when the friction engagement device is engaged and a shift to a gear position with a low gear ratio is performed;
    an engagement force intermediate correction portion which performs correction of an engagement force of the friction engagement device, which is controlled by the engagement force control portion in the course of the upshift; and
    an intermediate correction value learning correction portion which performs modification of one of an intermediate correction value and a duration time of the correction according to an actual shift state, the intermediate correction value and the duration time of correction represent an amount of the correction of the engagement force performed by the engagement force intermediate correction portion.

2. The shift control device according to claim 1, wherein the intermediate correction value learning correction portion performs modification of one of the intermediate correction control value and the duration time of the correction according to a change in an input revolution speed of the automatic transmission after the correction performed by the engagement force intermediate correction portion and before completion of the shift.

3. The shift control device according to claim 1, further comprising an initial engagement force learning correction portion which performs modification of an initial engagement force of the friction engagement device, which is controlled by the engagement force control portion, according to an actual shift state at a start of the upshift, wherein the intermediate correction value learning correction portion performs modification of one of the intermediate correction value and the duration time of the correction on a learning-permitting condition that the modification of the initial engagement force, which is performed by the initial engagement force learning correction portion, is in a converged state.

4. The shift control device according to claim 3, wherein the engagement force intermediate correction portion determines that the modification of the initial engagement force, which is performed by the initial engagement force learning correction portion, is in a converged state when an amount of the modification of the initial engagement force, which changes according to learning correction performed by the initial engagement force learning correction portion, is within a predetermined range, the engagement force intermediate correction portion then performs modification of one of the intermediate correction value and the duration time of the correction.

5. The shift control device according to claim 1, wherein the engagement force intermediate correction portion starts the correction of the engagement force when the 50% or more of the upshift process has been completed.

6. The shift control device according to claim 1, wherein the engagement force intermediate correction portion starts the correction of the engagement force when a speed deviation between the input revolution speed of the automatic transmission and a revolution speed at the gear position on the upshift side is equal to or less than a predetermined value.

7. The shift control device according to claim 6, wherein the predetermined value represents the speed deviation at a stage where the 50% or more of the upshift process has completed.

8. The shift control device according to claim 1, further comprising an actuator which generates the engagement force of the friction engagement device by using a hydraulic pressure, wherein the engagement force control portion controls the pressure of the actuator.

9. A shift control method for a vehicle comprising an automatic transmission wherein a plurality of gear positions with different gear ratios are established according to engagement/release states of friction engagement devices, comprising the steps of:
    performing correction of an engagement force that is provided to a predetermined friction engagement device from among the friction engagement devices in the course of an upshift at a time of the upshift when the friction engagement device is engaged and a shift to a gear position with a low gear ratio is performed; and
    performing modification of one of an intermediate correction value and a duration time of the correction according to an actual shift state, the intermediate correction value and the duration time of the correction represent an amount of the correction of the engagement force.

10. The shift control method according to claim 9, wherein the modification of one of the intermediate correction control value and the duration time of the correction is performed according to a change in an input revolution speed of the automatic transmission after the correction of the engagement force of the friction engagement device is performed in the course of the upshift and before the shift is completed.

11. The shift control device according to claim 9, further comprising a step of performing modification of an initial engagement force of the friction engagement device, according to an actual shift state at a start of the upshift, wherein the modification of one of the intermediate correction value and the duration time of the correction is performed on a learning-permitting condition that the modification of the initial engagement force is in a converged state.

* * * * *

UNITED STATES PATENT AND TRADEMARK OFFICE
CERTIFICATE OF CORRECTION

PATENT NO.    : 6,962,552 B2
DATED         : November 8, 2005
INVENTOR(S)   : Sakamoto et al.

It is certified that error appears in the above-identified patent and that said Letters Patent is hereby corrected as shown below:

Title page,
Item [73], Assignees, should read:
-- Toyota Jidosha Kabushiki Kaisha
   Toyota (JP)
   Aisin AW Co., Ltd., Anjo, (JP) --.

Signed and Sealed this

Thirty-first Day of January, 2006

JON W. DUDAS
*Director of the United States Patent and Trademark Office*